March 5, 1957
M. POLLOCK
2,783,992
BUMPERS
Filed Sept. 16, 1953
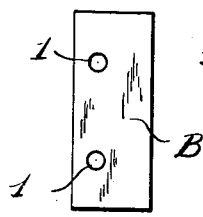
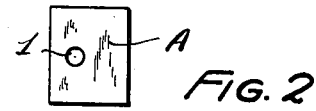
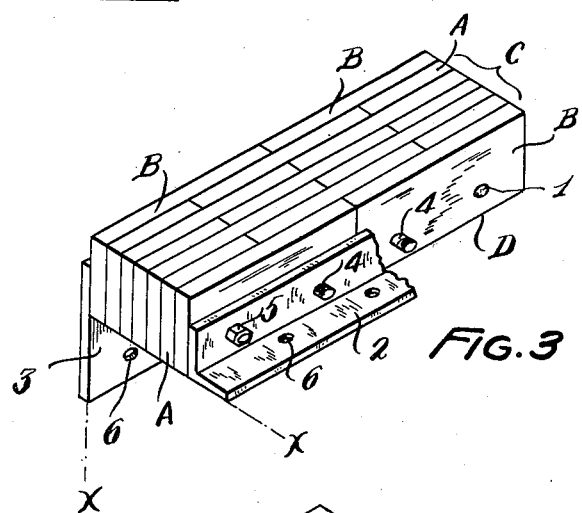
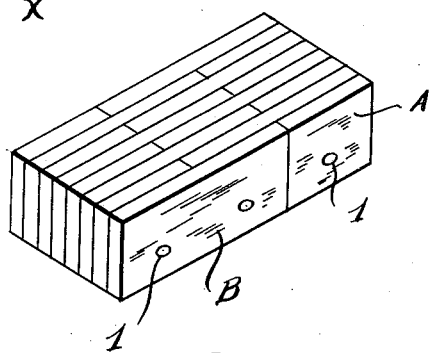
INVENTOR.
MAX POLLOCK
BY

2,783,992

BUMPERS

Max Pollock, East Cleveland, Ohio, assignor, by mesne assignments, to Bumpers, Inc., a corporation of Ohio Application September 16, 1953, Serial No. 380,535

1 Claim. (Cl. 267—1)

This invention relates to bumpers of the type employing pieces of rubber-impregnated fabric, arranged in a laminated block to act in edgewise relation to the work, such bumpers being employed in warehouses, truck loading and marine docks, on highway vehicles, as heavy duty floor mats, etc.

An object of the invention is to provide an arrangement whereby a wide choice of bumper sizes may be made from a small number of standard pieces, two only, of the latter, being necessary.

Another object is to provide a pattern of arrangement of the pieces in the block, wherein assembly is facilitated, as is replacement at locations receiving the greatest depreciation in service.

Still another object is to provide an arrangement of pieces, particularly those disposed at the endwise edges of the block—which edges usually receive the roughest treatment in service—whereby such pieces are relieved of some of the stresses which depreciate them.

Further objects and advantages will be apparent from the following description taken in connection with the accompanying drawings wherein Figs. 1 and 2 are plan views illustrating the faces of the two sizes of pieces employed;

Fig. 3 is a view in isometric perspective illustrating a bumper assembly employing such pieces, parts being removed to show details of construction, and the view including a broken line indicating an object on which the bumper may be mounted; and Fig. 4 is an isometric perspective view illustrating another bumper block employing such pieces.

With reference now to the drawings, and first to Figs. 1 and 2 thereof, the pieces are punched or otherwise cut from rubber-impregnated fabric such as flat industrial belting or vehicle tires, either of which may be or have become inadequate for originally intended usage, but may still be entirely suitable for the purpose of this invention. The piece A appearing in Fig. 2, is of length slightly greater than its width and has a circular opening 1 midway of its length and closer to one side edge than the other. The piece B appearing in Fig. 1, is of the same width but twice the length of the other piece and has two openings 1. The relation of the pieces is such that the piece B comprises a double unit whereas the piece A is a single unit which might be made by cutting one of the double units in two midway of its length. In practice, the lengths of such pieces may be three and six inches respectively, with their holes slightly greater than one half inch diameter and their thickness in the order of ⅝ of an inch.

With reference now to Fig. 3, a number of such pieces are arranged in a stack of face to face layers end to end in their layers, to provide a rectangular laminated bumper block of thickness the width of the pieces, and having substantially continuous front and back faces C and D in which the pieces run edgewise.

As here shown, the first layer is made of two double units B, as are alternate layers therebeyond, and the second layer is made up of a double unit B and a single unit A at each end thereof, as are their alternates; and both end layers are of double units, so that each single unit is disposed between two double units with face bearing throughout its area therebetween.

In all layers the pieces are so disposed that their openings 1 are adjacent the back face D of the block, so that openings in the adjacent units are in alignment to provide through openings spaced uniformly along the block.

The metal mounting members are relatively rigid, are arranged along the two edges of the block which are disposed in the direction of the layers, and each extends the length of the block; and metal rod members 4 are disposed in the openings to interconnect the mounting members in clamping relation.

As here shown, the near mounting member is in the form of an angle iron 2, the far mounting member is in the form of a plate 3, and the rods 4 threaded at their near ends to receive nuts 5, by which the pieces which form the bumper block may be firmly clamped together adjacent the back face D of the bumper block assembly. The mounting members extend from the back face D substantially short of the front face C of the block, and the mounting members may be provided with suitable openings 6 for securement of the assembly in its service location.

The mounting members illustrated are suitable for mounting of the bumper along a corner edge as indicated by the broken lines x—x. This manner of mounting would have application at the rear corner of a highway truck, wherein the front or working face C of the bumper would be disposed vertically facing the rear, with the edges of the pieces running vertically, the plate 3 secured to the side of the vehicle and the angle iron 2 secured to the rear of the vehicle frame.

It will be appreciated, however, that the form of the mounting members may be varied, suitable to the intended service. Thus, for a heavy duty floor bumper mat, both mounting members might be simply bars each having one edge flush with the back face D of the block and its other edge short of the front face C. Likewise, for some services such as in marine applications, the mounting members might have some curvature to match the surfaces upon which they are to be secured.

Also, the rods 4 may each be permanently welded, each to one of its mounting members, as to the plate 3 instead of being threaded at each end, as at the angle iron 2.

It will be observed that the pattern of the pieces in the block, and particularly its faces, is such that at each end of the block each alternate layer terminates in a single unit A which has an end edge disposed at an end edge of a double unit in its layer and its faces completely disposed and clamped between a pair of double units B in the next two layers, which double units are in staggered relation with each other, and a double unit is disposed at each of the four corners of the block. Also, each single unit A receives but one of the rods 4, midway of its length, whereas each double unit B receives a pair of rods 4.

In service, often the end corners of the block receive the severest treatment. According to my invention it is at such ends that the single units A are located.

In operation, when a severe bumping blow is received by the block at such corners, the single units A may have slight yield about their rods 4. Such yield is frictionally opposed by the face bearing of the single units against their next adjacent double units. At the same time the single units are relieved of tensile stresses at their inner end edges, and the double units each may slightly give or arch between their two mounting rods 4. The result is that by the arrangement described the life of the bumper block at its ends is substantially extended beyond that heretofore attained in the art.

It will be understood that for the above purposes, as well as for ease of assembly, the fit of the rods 4 in the openings 1 of the pieces is a somewhat loose one.

For replacement of the single units A, at either end of the block, it is only necessary to remove the corresponding rod 4, loosen the remaining rods, remove and replace the single units, replace the rod 4, and retighten all of the rods.

Fig. 4 illustrates an arrangement of single and double units to provide a shorter bumper block, yet retains much of the advantages described above. Here each layer is made up of one single and one double unit so that the length is only three-fourths of that of the block illustrated in Fig. 3, but here again, as to most of the layers, at each end of the block each single unit is disposed between a pair of double units—this with the exception of the two single units disposed at two diagonally opposite corners of the block.

Similarly, and employing the same general principles of my invention, it is possible to assemble a block of length half that of Fig. 3, employing a double unit only, at each end of the stack of pieces, and a pair only, of single units in alternate layers therebetween.

For simplicity of illustration only a few layers appear in the drawings, whereas in practice a great many more layers will often be employed. Indeed, in many applications their number will be such that the relative dimensions of the block face is reversed, in that its dimension in the direction of the rods 4 becomes substantially greater than that in the direction in which the layers run.

Similarly, it will be appreciated that by employment of more units per layer, but in the same pattern arrangement, a bumper of desired greater length may be provided.

What I claim is:

A bumper of the class described comprising: a plurality of flat rectangular pieces of rubber-impregnated fabric, arranged in a stack of face to face layers, end to end in their layers, to provide a laminated bumper block of thickness the width of said pieces and having substantially continuous front and back faces in which said pieces run edgewise, metal mounting members extending continuously substantially entirely along the two edges of said block disposed in the direction of said layers, and metal rod members interconnecting said mounting members at locations spaced uniformly therealong and extending through the pieces therebetween, to secure said layers clamped together in said stack by and between said mounting members, said mounting members being located adjacent the back surface of said block to extend therefrom substantially short of the front surface thereof, said pieces including single and double units, each single unit being half the length of said double units and having an opening midway of its length and receiving one of said rod members, and the remaining units being double units each having a pair of openings receiving a pair of said rod members, said units being arranged in said block in a pattern such that each single unit is located at an end of its layer with an end abutting an end of a double unit, and has a face bearing against half of a double unit in the next layer.

References Cited in the file of this patent

UNITED STATES PATENTS

| | | |
|---|---|---|
| 1,490,296 | Swanson | Apr. 15, 1924 |
| 1,921,734 | Dunlap | Aug. 8, 1933 |
| 2,307,255 | Bell | Jan. 5, 1943 |
| 2,649,295 | Schuyler | Aug. 18, 1953 |

FOREIGN PATENTS

| | | |
|---|---|---|
| 418,606 | Great Britain | Oct. 29, 1934 |
| 723,068 | France | Jan. 9, 1932 |